United States Patent [19]

Lefillatre

[11] Patent Number: 4,663,086

[45] Date of Patent: May 5, 1987

[54] PROCESS FOR BITUMINIZING RADIOACTIVE WASTE CONSTITUTED BY CATION AND/OR ANION EXCHANGE RESINS

[75] Inventor: Guy Lefillatre, Avignon, France

[73] Assignee: Commissariat a l'Energie Atomique, Paris, France

[21] Appl. No.: 708,681

[22] Filed: Mar. 6, 1985

[30] Foreign Application Priority Data

Mar. 21, 1984 [FR] France ................................ 84 04390

[51] Int. Cl.[4] .......................... G21F 9/16; B01D 15/00

[52] U.S. Cl. .................................... 252/628; 210/660; 252/626; 252/631; 423/7; 521/28

[58] Field of Search ............... 252/628, 626, 631, 629; 423/6, 7, 249; 376/313; 210/670, 673, 660, 663, 668, 681, 682, 683; 106/235; 521/26, 28, 32, 30

[56] References Cited

U.S. PATENT DOCUMENTS

| | | | |
|---|---|---|---|
| 3,716,490 | 2/1973 | Van de Voorde | 252/628 |
| 4,122,048 | 10/1978 | Buchwalder et al. | 252/628 |
| 4,204,974 | 5/1980 | Puthawala et al. | 252/628 |
| 4,401,591 | 8/1983 | Korostenski | 252/629 |
| 4,530,723 | 7/1985 | Smeltzer et al. | 252/628 |

FOREIGN PATENT DOCUMENTS

| | | | |
|---|---|---|---|
| 3103473 | 12/1981 | Fed. Rep. of Germany . | |
| 2356246 | 1/1978 | France . | |
| 2505539 | 11/1982 | France . | |
| 0014195 | 2/1981 | Japan | 252/628 |
| 8500922 | 2/1985 | PCT Int'l Appl. | 252/628 |

*Primary Examiner*—Stephen J. Lechert, Jr.
*Assistant Examiner*—Howard J. Locker
*Attorney, Agent, or Firm*—Pearne, Gordon, McCoy & Granger

[57] ABSTRACT

The invention relates to a process for bituminizing radioactive waste constituted by cation and/or anion exchange resins.

This process comprises a resin pretreatment stage performed so as to replace the $H^+$ ions of the cation exchange resins by ions chosen from the group including $Ca^{++}$, $Sr^{++}$ and $Ba^{++}$ and/or for replacing the $OH^-$ and/or $Cl^-$ ions of the anion exchange resins by an anion chosen from the group including $NO_3^-$, $HCO_2^-$ and $CH_3CO_2^-$.

This pretreatment makes it possible to increase the capacity of the coating installation and limit the swelling in water of the bituminized coatings obtained.

7 Claims, 2 Drawing Figures

Figure 1:
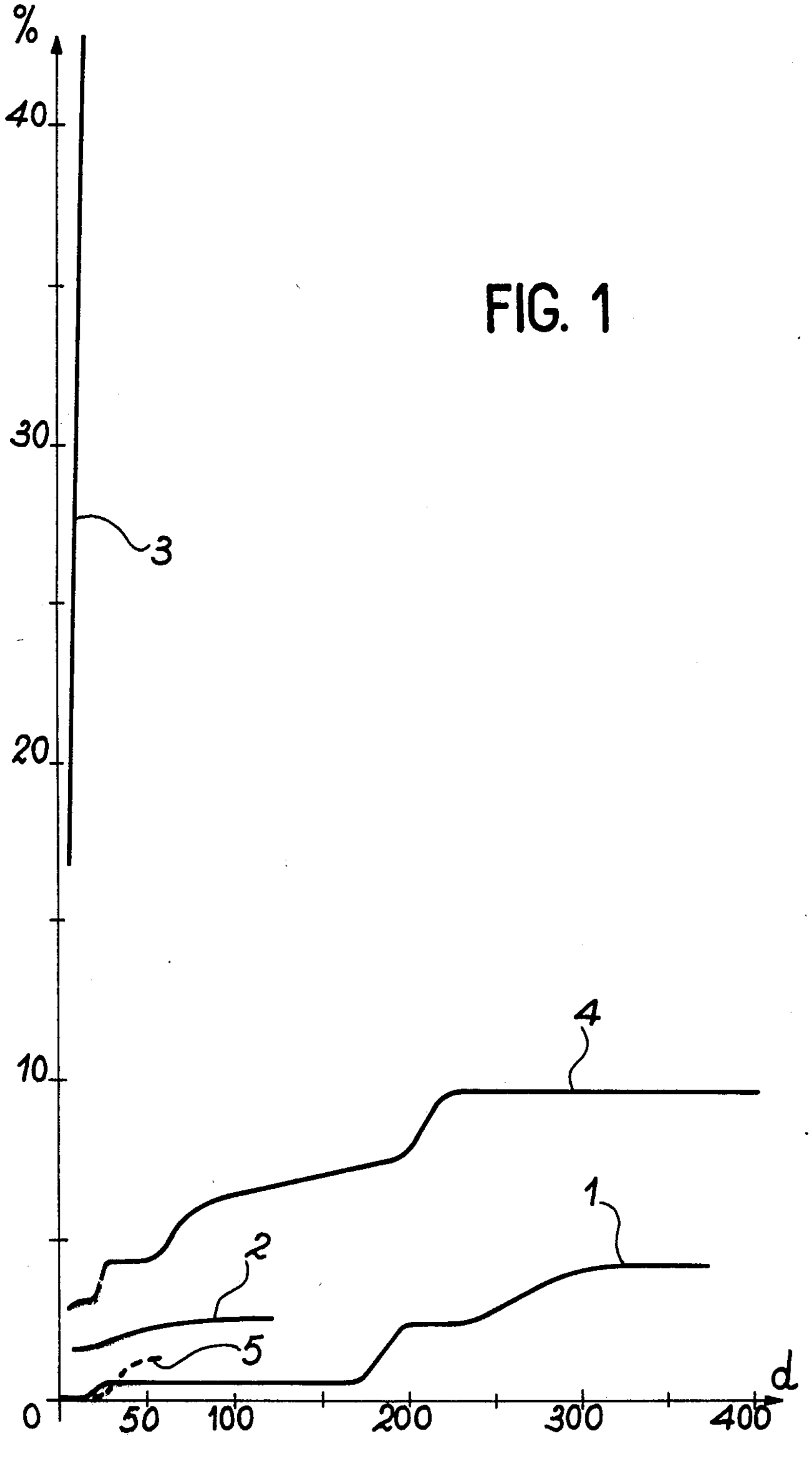

PROCESS FOR BITUMINIZING RADIOACTIVE WASTE CONSTITUTED BY CATION AND/OR ANION EXCHANGE RESINS

BACKGROUND OF THE INVENTION

The present invention relates to a conditioning process involving the coating in bitumen of radioactive waste constituted by ion exchange resins.

The bitumen coating of radioactive waste is generally performed by mixing an aqueous suspension of the radioactive waste with fluidized bitumen, followed by the evaporation of the water of the suspension and pouring the thus obtained mixture into a container in order to solidify it.

French Pat. No. 1,315,162, filed on Dec. 6, 1961 by the Commissariat à l'Energie Atomique, describes a bituminizing process of this type, according to which the suspension of the waste is mixed with fluidized bitumen in the presence of a surfactant, which facilitates the separation of the water contained in the separation. Most of this water is then separated either by decanting, or by means of a mechanical device and the product obtained after separating the water is then mixed at a temperature to ensure that it is sufficiently fluid and is finally poured or cast in such a way that cooling leads to solid blocks having an appropriate plasticity.

French Pat. No. 2,052,093 filed on July 15, 1969 by the Commissariat à l'Energie Atomique described an installation for coating a suspension of radioactive products with bitumen using a film evaporator and a gear pump for extracting the coated products obtained at the bottom of the evaporator.

French Pat. No. 2,356,246 describes an improvement to the processes for coating radioactive waste with bitumen consisting of subjecting the waste to a pretreatment by salts, such as calcium and barium chlorides, in order to improve the resistance to leaching of the solidified products obtained. In this case, the treated waste is constituted by evaporation concentrates and/or precipitation sediment comprising salts, such as sodium sulphates and carbonates.

Installations for the continuous coating of radioactive waste suspensions are also known, which use a twin or four screw extruder, in which the waste is mixed with bitumen and the suspension is dried.

Generally, before coating the suspension of the waste, the latter undergoes a neutralization treatment using soda. Thus, it is inadvisable to bitumen coat acid suspension, particularly free nitric acid, in order to obviate any risk of deterioration of the bitumen at the end of the operation when, after evaporating the water, the bitumen is in the presence of concentrated acid. Moreover, neutralization before bitumen coating limits corrosion to the installations.

When the radioactive waste is formed by organic ion exchange resins, particularly of the anionic type in form $OH^-$ and/or $Cl^-$, the performance of the bitumen coating processes does not make it possible to obtain an adequate treatment capacity of the bituminizing installation. Moreover, the bituminous coatings obtained suffer from the major disadvantages of swelling when subsequently immersed in water. In this case, the volume increase of the coatings can reach 20% and even exceed 100% in certain cases, which leads to a disintegration of the coated waste.

Processes for conditioning ion exchange materials in thermosetting resins or in cement are also known of the type described in French Pat. No. 2,361,724 and Japanese Pat. No. 48-28899. According to these processes, in order to obtain crack-free conditioned products, it is necessary to pretreat the ion exchange resins to replace the $H^+$ ions by other cations, in order to ensure that the resins do not fix certain of the reagents necessary for obtaining the setting of the thermosetting resin or the cement.

German Pat. No. 3,102,473 also describes a process for pretreating a mixture of cation and anion exchange resins, which then makes it possible to separately condition the resins by incorporation in bitumen or cement. According to this patent, in order to separate the cation exchange resins from the anion exchange resins, the resin mixture is contacted with an aqueous solution of a salt, such as an alkali metal acetate, nitrate, chloride or sulphate, in order to replace the $H^+$ and/or $Na^+$ ions of the cationic resins by sodium and the $OH^-$ ions of the anionic resins by other anions. The resins can then be separated by means of a liquid, whose density is between that of the grains of one type of resin and that of the grains of the other type of resin. Thus, this patent does not deal with the problem of swelling in water on the part of the bituminous coatings.

SUMMARY OF THE INVENTION

The present invention relates to a process for conditioning with bitumen radioactive waste constituted by ion exchange resins, which comprises a pretreatment stage making it possible to solve the problems referred to hereinbefore.

The present invention specifically relates to a process for conditioning by bituminizing radioactive waste constituted by cation and/or anion exchange resins wherein it comprises:

(a) subjecting said resin or resins to a pretreatment using a salt for replacing the $H^+$ and/or $Na^+$ ions of the cation exchange resins by ions chosen from the group including $Ca^{++}$, $Sr^{++}$ and $Ba^{++}$ and/or for replacing the $OH^-$ and/or $Cl^-$ ions of the anion exchange resins by an anion chosen from the group including $NO_3^-$, $HCO_2^-$ and $CH_3CO_2^-$, (b) suspending the thus pretreated resin or resins in water, and (c) bituminizing said suspension.

According to a feature of the invention, pretreatment is carried out by contacting, preferably accompanied by stirring, the said resins with an aqueous solution of a calcium, strontium or barium salt, said salt being chosen from the group including nitrates, acetates and formates.

This way of performing the pretreatment is particularly suitable for the treatment of a mixture of cation and anion exchange resins, because it permits the simultaneous replacement of the $OH^-$ or $Cl^-$ ions of the anionic resins by nitrate, acetate or formate anions and also the replacement of the $H^+$ ions of the cationic resins by calcium, strontium and barium.

In this case, use is generally made of an aqueous solution of barium acetate or nitrate for carrying out the pretreatment. Thus, the use of barium nitrate is preferable, because the $NO_3^-$ anion is generally present in effluence, particularly in the effluence of reprocessing centres and nuclear research centres.

As a result of the pretreatment according to the invention, a modification takes place to the structure of the three-dimensional network of the ion exchange resins by introducing into the molecular chain ions such as $Ba^{++}$ and/or $NO_3^-$ or $CH_3COO^-$, which occupy more space than the previously present $H^+$, $OH^-$ and $Cl^-$ ions. This makes it possible to prevent the penetration of water into the denser, macromolecular network of the pretreated resin, thereby reducing the degree of hydration of the resin.

Thus, ion, anion and cation exchange resins have the special feature of significantly inflating in water. Their volume increase is generally approximately 20% for anion resins in the form $OH^-$ and/or $Cl^-$ and exceeds 50% for cation resins in the form $Na^+$. This swelling is due to the penetration of water into the three-dimensional skeleton of the resins and in particular hydrophilic in the case of anionic resins having quaternary or amino ammonium groups and in the case of cationic resins having sodium sulphonate groups, grafted on a polystyrene radical for both resin types. Therefore, the treatment capacity of the bituminizing installations is lower on treating resins of these types. Moreover, the coatings obtained at the end of the bituminizing treatment suffer from the disadvantage of swelling in water.

However, when, in accordance with the invention, the ion exchange resins are pretreated, the hydration capacity of the macromolecular network of the resins is reduced, so that it is possible to increase the treatment capacity of the bituminizing installations and limit the swelling of the coatings obtained in contact with water.

Thus, according to the process of the invention, the stage of pretreating ion exchange resins with a salt, such as barium nitrate, does not serve the same object as the pretreatment stage in the prior art processes of French Pat. No. 2,361,724 and Japanese Pat. No. 48-28899, because it is not intended to prevent the ion exchange resins from consuming certain of the reagents necessary for the coating matrix formation reaction.

In the same way, the pretreatment stage according to the invention does not have the same objective as the pretreatment stage of French Pat. No. 2,356,246. Thus, in this patent, the waste is constituted by evaporation concentrates and/or sediments of radioactive materials such as chemical precipitation sediments containing salt and the problem to be solved is that of converting the salts such as sodium carbonate and sulphate into salts having a reduced tendency to trap molecules of water.

In the present invention, the waste is constituted by ion exchange resins, which do not contain salts and the problem to be solved in that of reducing the hydration capacity of the macromolecular network of the ion exchange resins.

For the bituminizing operation, the conventional procedure is adopted using e.g. the processes described in French Pat. Nos. 1,315,162 and 2,052,093, or U.S. Pat. No. 3,298,961. The means used are also of a conventional nature and can comprise film evaporators, twin or four screw extruders, etc.

The process according to the invention is more particularly applied to the treatment of cationic and/or anionic resins with a polystyrene skeleton in ball and/or ground form.

Examples of such resins are those in the form of balls, such as the resin sold under the trade mark DUOLITE by DIAPROSIM or resins marketed under the trade mark AMBERLITE by ROHM and HAAS. Examples of ground resins are those sold under the MICROIONEX mark by DIAPROSIM.

When, according to the invention, mixed cationic and anionic resins are treated, it is possible to use any random proportion of anionic resins in the range 0 to 100%.

For performing the process according to the invention, a pretreatment stage is preferably performed by introducing into a container a certain quantity of an aqueous solution of a salt of $Ba^{++}$, $Ca^{++}$ or $Sr^{2+}$ containing $NO_3^-$, $HCO_2^-$ or $CH_3CO_2^-$ ions. The resins to be pretreated are suspended in the solution and stirring takes place for an adequate time, and, as a function of the salt concentration of the solution, this is chosen so as to obtain the desired saturation level of the ion exchange resins.

Preferably, the salt concentration and the treatment time are chosen so as to obtain a saturation level of the ions $NO_3^-$, $HCO_2^-$ or $CH_3CO_2^-$ of the anion exchange resins close to 100%.

As a result of the pretreatment of the ion exchange resins according to the process of the invention, the bimunizing process can be improved by:

(1) increasing the treatment capacity of the bituminizing installation by 50%, because the volume of the resin suspended in the wafer is reduced and the evaporation capacity of the bituminizing device is increased;

(2) eliminating from the distillates the products which deteriorate anionic resins, particularly $NH_3$ and $CH_3NH_2$, as a result of a chemical stabilization of the tertiary amine or quaternary ammonium functional groups, which makes it possible to recover neutral condensates instead of basic condensates; and (3) limiting the swelling process of the bituminous coatings in water, their volume increase not exceeding 5%, as will be shown hereinafter.

DESCRIPTION OF THE DRAWINGS AND EXEMPLIFIED EMBODIMENTS

Figure 2:
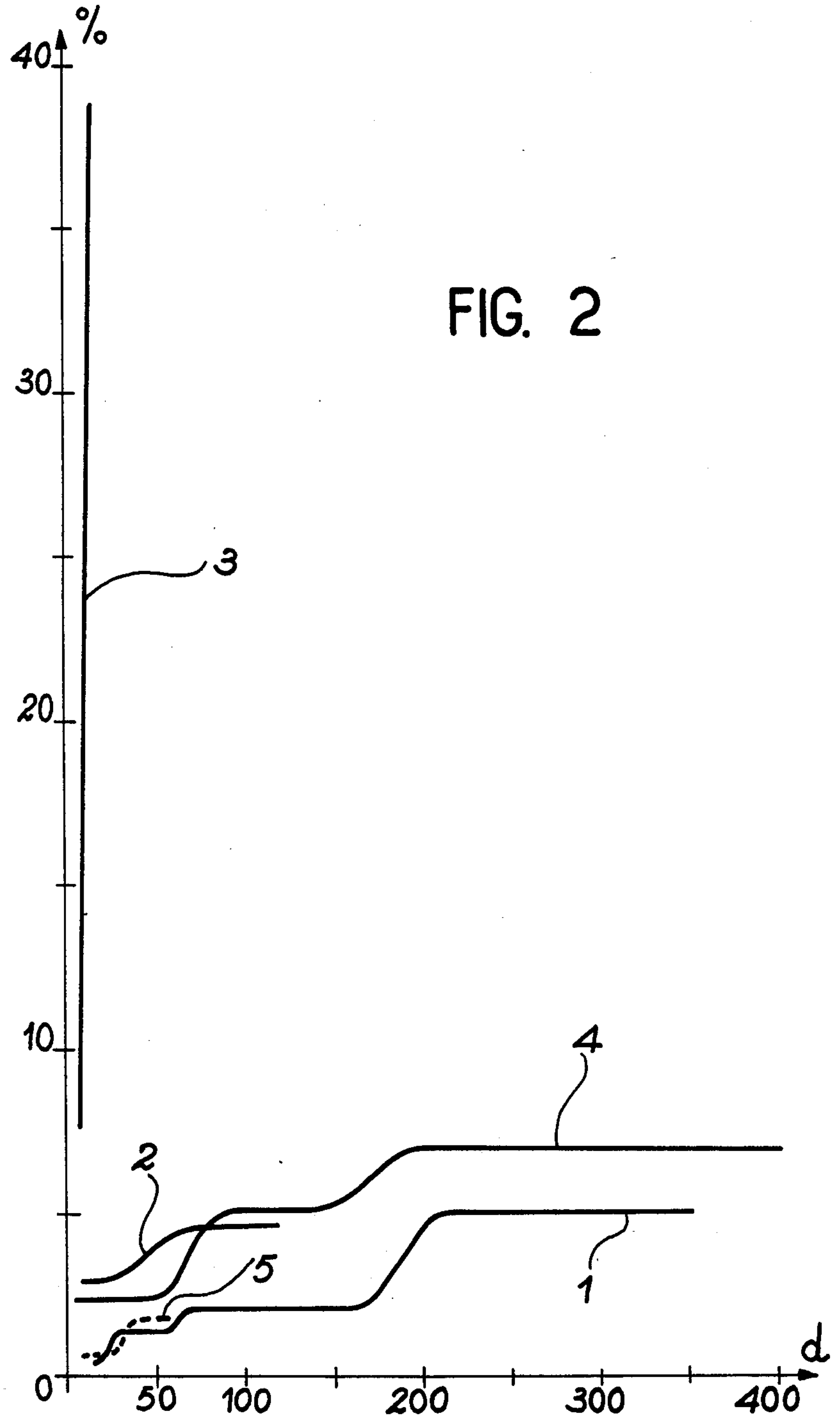

Other features and advantages of the invention can best be gathered from the study of the following illustrative and non-limitative examples and with reference to the attached drawings, wherein show FIGS. 1 and 2 being graphs showing the volume increase percentage of bituminous coatings of cation exchange resins, obtained either by the prior art process, or by the process according to the invention, as a function of the immersion time in water.

EXAMPLE 1

This example illustrates the treatment of cation exchange resins AMBERLITE IR 120 H. The resins are transferred by means of a hydroejector using demineralized water into a treatment vessel, equipped with a mechanical stirrer and a device for the ultrasonic detection of the solid-liquid interface level.

After decanting the resin mixture for a period which can extend to between 24 and 48 hours, depending on whether the resins are in ball or ground form, the supernatant water is eliminated, either by pumping, or by vacuum siphoning. Complementary resin quantities are again transferred and the decanting, pumping and vacuum siphoning operations are repeated until the volume V of the decanted resins reaches 50% of the volume of the vessel.

A 0.37 $mol.l^{-1}$ barium nitrate solution is prepared in an auxiliary vessel and into the treatment vessel is introduced a volume V of said solution, i.e. a volume identical to that occupied by the decanted resins. This is all stirred for 2 hours. Decanting is then allowed to continue for 1 hour and the supernatant solution is eliminated by means of a pump, a vapour ejector, or by vacuum siphoning. In this case, the volume of the eliminated solution corresponds to 1.22 V, which shows that not only the pretreatment solution, but also a certain quantity of the water absorbed by the resins, is eliminated, said quantity representing 14% of the initial volume of the decanted humid resins.

This operation is repeated 3 times to obtain a $Ba^{++}$ saturation level of the resins close to 100%, due to the $Ba(NO_3)_2$ concentration of the solution (0.37 mol.l$^{-1}$) and the contacting time.

The saturation treatment leads to a salting out of 10 to 15% of the initial activity of the resins. In addition, the supernatant radioactive solution is returned to the head of the liquid effluent treatment station, either upstream of an evaporator, or upstream of a chemical coprecipitation chain.

Following decanting and eliminating then of the supernatant solution, the pretreated resins are washed with demineralized water also using a washing water volume equal to 0.65 V, i.e. identical to that of the pretreated, decanted resins. The pH of the resin suspension is adjusted to 7.5±0.2 with the aid of a barium slurry containing 300 g.l$^{-1}$ of $Ba(OH_2)$. This washing operation is repeated four times, whilst checking the $NO_3^-$ concentration of the washing waters after each operation until a $NO_3^-$ concentration of the washing waters below 2 g.l$^{-1}$ is obtained.

Thus, it is necessary to wash the pretreated resins before conditioning them in bitumen, because if the excess barium nitrate were added to the dry extract of the resins, this would have the disadvantage of increasing not only the volume of the final residue, but also of aiding the leaching of this soluble salt in water.

The transfer and washing waters are very slightly radioactive and are returned to the effluent treatment station, where their degree of radioactivity was checked.

The pretreated, washed resins are then resuspended in demineralized water using 0.4 to 0.45 V of water for a proportion of 0.6 to 0.55 V of the resin mixture. The suspension of the pretreated organic resins is then passed to the bituminizing installation, which is of the four screw drying extruder type. The properties of the coatings leaving the bituminizing installation are then checked.

Table 1 gives the results obtained in connection with the hourly evaporation capacity of the extruder and the composition of the coating obtained during a bituminizing operation performed with resins in ball form.

The swelling properties in water of the coatings obtained are then evaluated. These have been cast and solidified in the form of cylindrical test pieces with a diameter of 48 mm and a height of 90 mm.

In order to determine the swelling in water, the coatings are immersed in non-renewed ordinary or demineralized water and periodically the percentage volume increase of the coatings is measured as a function of the immersion time in days.

The volume ratio between the water and the coatings is 4.5 and the surface/volume ratio of the coatings 10.5 cm$^{-1}$.

The results obtained are given in curves 1 of FIGS. 1 and 2, which represent the volume increase percentage of the coatings as a function of the time in days. FIG. 1 illustrates the results obtained with ordinary water and FIG. 2 the results obtained with demineralized water.

On the basis of these results, it can be seen that the swelling of the coatings after 365 days immersion in ordinary water is 4.2% by volume or 4.45% by weight and that it is 5.0% by volume or 5.1% by weight after 365 days immersion in demineralized water.

EXAMPLE 2

Cation exchange resins AMBERLITE IR 120H are treated as in example 1, but using aqueous 1.5 mol.l$^{-1}$ barium acetate solution instead of aqueous 0.37 mol.l$^{-1}$ barium nitrate solution.

A 1.5 mol.l$^{-1}$ barium acetate solution is prepared in an auxiliary vessel and into the treatment vessel is introduced a volume V of said solution, i.e. a volume identical to that occupied by the decanted resins. The mixture undergoes stirring for 2 hours making it possible to obtain a $Ba^{2+}$ saturation level of the resins exceeding 90% due to the $Ba(CH_3COO)_2$ concentration of the solution (1.5 mol.l$^{-1}$) and the contacting time. Decanting is then allowed to take place for 1 hour and the supernatant solution is eliminated by means of a pump, a vapour ejector or vacuum siphoning.

In this case, the volume of the solution eliminated corresponds to 1.34 V, which shows that not only has the pretreatment solution been eliminated, but also a certain amount of the water absorbed by the resins, said quantity representing 21% of the volume of the decanted humid resins.

Following decanting and elimination of the supernatant solution, the pretreated resins are washed with demineralized water using a washing water volume equal to 0.83 V, i.e. identical to that of the pretreated, decanted resins. The pH of the suspension of resins is adjusted to 7.5±0.2 with the aid of a barium slurry containing 300 g.l$^{-1}$ of $Ba(OH)_2$.

This washing operation is repeated three times whilst checking the $CH_3CO_2^-$ concentration of the washing waters after each operation until a $CH_3CO_2^-$ concentration thereof below 2 g.l$^{-1}$ is obtained. The operation is continued as in example 1 and bituminizing is carried out under the same conditions using a blown MR 90/40 bitumen.

The properties of the coatings leaving the bituminizing installation are then checked.

The results obtained are given in curves 2 of FIGS. 1 and 2, which show the volume increase percentage of the coatings as a function of the time (in days) during which they were immersed in non-renewed ordinary water (FIG. 1) or in non-renewed demineralized water (FIG. 2).

On the basis of FIGS. 1 and 2, it can be seen that the swelling of the coatings after 120 days immersion in ordinary water is 2.45% by volume or 3.4% by weight and that the swelling after 120 days immersion in demineralized water is 4.9% by volume of 5.0% by weight.

EXAMPLE 3

In this example, as in example 1, balls of AMBERLITE IR 120H resin are treated, but using a 1.5 mol.l$^{-1}$ soda solution in place on the barium nitrate solution which has the effect of bringing the resins into $Na^+$ form. The pretreated resins are coated with MR 90/40 bitumen under the same conditions as in example 1, followed by the determination of the properties of the coating obtained as in example 1.

The results obtained are given in table 1 and in curves 3 of FIGS. 1 and 2, which represent the volume increase percentage of the coatings as a function of the time in days during which they were immersed in renewed ordinary water (FIG. 1) or renewed demineralized water (FIG. 2).

It can be seen from these results that the swelling of the coatings after 15 days immersion in demineralized water or ordinary water is very significant. Thus, swelling is 38.7% by volume or 25.1% by weight in the case of demineralized water and 50.1% by volume or 45.6% by weight in the case of ordinary water. Thus, in the process of the invention, the choie of salt for the pretreatment has a very significant effect on the results obtained.

EXAMPLE 4

This example illustrates the treatment of anion exchange resins AMBERLITE IRN-78L. Using the operating procedure of the preceding examples, in this case use is made of AMBERLITE IRN-78L resin balls using a 1.5 mol.l$^{-1}$ sodium nitrate solution and washing the $NO_3^-$-saturated resins with demineralized water until a supernatant product is obtained, whose salinity is below 2 g.l$^{-1}$. The pretreated resins are coated in blown bitumen MR 90/40 under the same conditions as in the preceding examples, followed by the determination of the properties of the coatings obtained. The results obtained are given in table 1 and in curves 4 of FIGS. 1 and 2, which represent the volume increase percentage of the coatings as a function of the time in days during which they were immersed in non-renewed ordinary water (FIG. 1), or in non-renewed demineralized water (FIG. 2).

The results show that the swelling of the coatings after 365 days immersion is 9.5% by volume or 6.1% by weight in the case of ordinary water and 7.2% by volume or 7.1% by weight in the case of demineralized water.

EXAMPLE 5

Anion exchange resins AMBERLITE IRN-78L are treated as in example 4, but using an aqueous 1.5 mol.l$^{-1}$ barium acetate solution. The operating procedure is identical to that of example 4. The results obtained with the coatings leaving the bituminizing installation are given in table 1 and in curves 5 of FIGS. 1 and 2. It can be seen that the swelling of the coatings after 55 days immersion in demineralized water is 1.7% by volume of 4.9% by weight and that swelling after 55 days in ordinary water is 1.2% by volume or 4.6% by weight.

TABLE 1

| Suspension of AMBERLITE resins in ball form, which have undergone bituminizing. | Evaporation capacity of the extruder during bituminizing (in kg · h$^{-1}$ of water) | Coating casting temperature (in °C.) | Composition of the coating in % by weight bitumen MR90/40 (B) dry extract (ES) water |
|---|---|---|---|
| Ex. 1 IR12OH resins pretreatment reagent $Ba(NO_3)_2$ | 160 | 165 | 54.1 (B)<br>44.4 (ES)<br>1.5 ($H_2$) |
| Ex. 2: IR12OH resins pretreatment reagent $Ba(CH_3CO_2)_2$ | 162 | 158 | 54.2 (B)<br>44.5 (ES)<br>1.3 ($H_2O$) |
| Ex. 3: IR12OH resins pretreatment reagent NaOH | 143 | 159 | 55.7 (B)<br>43.0 (ES)<br>1.3 ($H_2O$) |
| Ex. 4: IRN-78L resins pretreatment reagent $NaNO_3$ | 144 | 160 | 51.9 (B)<br>46.7 (ES)<br>1.4 ($H_2O$) |
| Ex. 5: IRN-78L resins pretreatment reagent $Ba(CH_3CO_2)_2$ | 147 | 165 | 55.6 (B)<br>43.1 (ES)<br>1.3 ($H_2O$) |

What is claimed is:

1. A process for conditioning by bituminizing radioactive waste constituted by organic cation and/or anion exchange resins which comprises:
   (a) subjecting said resin or resins to a pretreatment using a salt for replacing the H+ and/or Na+ ions of the cation exchange resins by ions chosen from the group consisting of Ca++, Sr++ and Ba++ and/or for replacing the $OH^-$ and/or $Cl^-$ ions of the anion exchange resins by an anion chosen from the group consisting of $NO_3$, $HCO_2$ and $CH_3CO_2^-$, wherein the pretreatment comprises contacting said resin or resins with an aqueous solution of said salt and separating said resin or resins from this solution,
   (b) suspending the thus pretreated resin or resins in water, and
   (c) bituminizing said suspension.

2. A process according to claim 1, wherein said salt comprises a salt having cations chosen from the group consisting of calcium, strontium or barium and anions chosen from the group consisting of nitrates, acetates, and formates.

3. A process according to any one of the claims 1 or 2, wherein the pretreatment is carried out in such a way as to obtain an approximately 100% $NO_3^-$, $HCO_2^-$ or $CH_3CO_2^-$ saturation level of the anion exchange resins.

4. A process according to claim 2, wherein the salt is barium nitrate.

5. A process according to claim 2, wherein the salt is barium acetate.

6. A process according to claim 2, wherein the pretreatment step results in 100% nitrate saturation of the anion exchange resin.

7. A process according to claim 1, wherein the radioactive waste is constituted by an anion exchange resin and the salt comprises a salt having anions chosen from the group consisting of nitrates, acetates, and formates.

* * * * *